May 1, 1923.

J. F. O'CONNOR

ANTIFRICTION SIDE BEARING

Filed Feb. 18, 1922

1,453,695

Witnesses
Wm. Geiger

Inventor
John F. O'Connor
By Geo. I. Haight
His Atty

Patented May 1, 1923.

1,453,695

UNITED STATES PATENT OFFICE.

JOHN F. O'CONNOR, OF CHICAGO, ILLINOIS, ASSIGNOR TO WILLIAM H. MINER, OF CHAZY, NEW YORK.

ANTIFRICTION SIDE BEARING.

Application filed February 18, 1922. Serial No. 537,427.

*To all whom it may concern:*

Be it known that I, JOHN F. O'CONNOR, a citizen of the United States, residing at Chicago, in the county of Cook and State of Illinois, have invented a certain new and useful Improvement in Antifriction Side Bearings, of which the following is a full, clear, concise, and exact description, reference being had to the accompanying drawings, forming a part of this specification.

This invention relates to improvements in anti-friction side bearings.

An object of the invention is to provide an anti-friction side bearing for railway cars wherein the anti-friction elements are self-centering under the influence of gravity and the parts so arranged as to provide for unlimited travel, the bearing being especially adapted for use as a body bolster side bearing.

Figure 1:
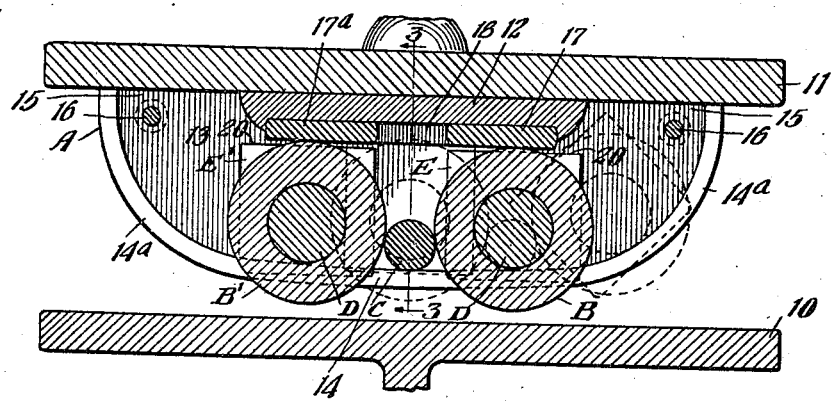
Figure 2:
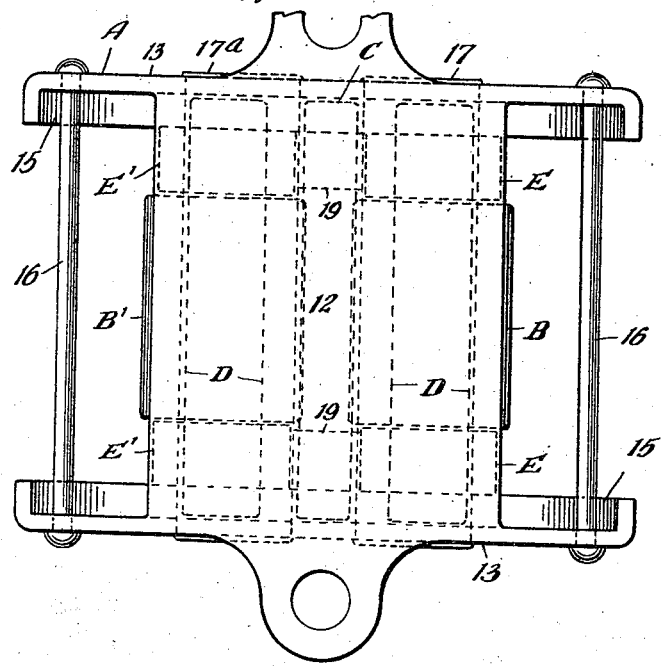
Figure 3:
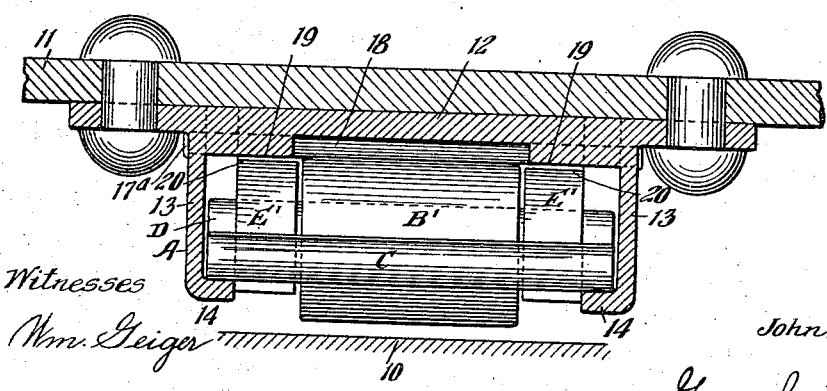

In the drawing forming a part of this specification, Figure 1 is a vertical, sectional view taken through the body and truck bolsters of a car parallel to the center line of the car and showing my improvements in connection therewith. Figure 2 is a top plan view of the side bearing proper, detached. And Figure 3 is a vertical, sectional view corresponding to the section line 3—3 of Figure 1.

In said drawing, 10 denotes the upper portion of a truck bolster and 11 the under side of an opposed body bolster. As shown, my improved bearing is applied to the body bolster 11 and comprises, broadly, a housing, base casting or retaining member A; a pair of anti-friction bearing rollers B—B'; a spacing roller or rod C; journals D—D for the rollers B—B'; and journal bearing blocks E and E' for the rollers B and B', respectively.

The housing or retaining member A, as shown, is formed with a flat top wall 12, depending side walls 13—13, and inturned supporting flanges 14—14 along the bottom edges of the side walls 13. Said supporting flanges 14 are extended horizontally at their central portions and are curved upwardly as indicated at 14ª—14ª at each end. The housing A is left open at the top at each end as indicated at 15—15 to permit insertion of the rollers B and B' and parts associated therewith before the bearing is applied to the bolster. After the parts are assembled with the housing A, they are held against accidental removal during shipment by cross rods or rivets 16—16 extending through the open places 15.

On its under side, the top wall 12 of the housing is provided with two bearing plates 17 and 17ª, of case hardened steel or other suitable wear-resisting metal. Said plates 17 and 17ª may be in the form of keys extended horizontally through suitable alined openings in the side walls of the housing and riveted over at their ends so as to maintain them in place. As clearly appears from Figure 1, said bearing plates 17 and 17ª provide two downwardly facing or upper bearing surfaces of limited extent and are separated longitudinally, that is, in the direction in which the rollers B and B' roll when in operation, thus leaving a space between the bearing plates as indicated at 18 in the central portion of the housing, for the purpose hereinafter described. Said space 18 is extended in length only slightly more than the length of the rollers B and B', as indicated in Figure 3 and the housing A is formed on opposite sides with longitudinally extending tracks 19—19 which are continuous across the ends of the recess 18, as shown in Figure 3.

The rollers B and B' are preferably of like construction and are made of suitable material adapted to resist crushing, and the same are centrally apertured to accommodate the journals D—D. The latter are extended sufficiently so that, at their extreme ends, they rest upon their supporting guide flanges 14 and intermediate said guide flanges 14 and the respective ends of the rollers B and B', said journals have applied thereto the journal bearing blocks E and E'. The latter are preferably square in outline as shown in Figure 1 and it will be noted that the top edges 20—20 of said bearing blocks are normally slightly spaced below the tracks 19—19 and also below the bearing surfaces provided by the plates 17 and 17ª.

The spacing rod or roller C is supported at its ends on the flanges 14 as shown best in Figure 3 and is adapted to maintain the rollers B and B' at a fixed distance apart.

The operation is as follows, assuming the parts to start from the full line positions indicated in Figure 1 and the truck bolster moving toward the right as viewed in Figure 1. Initially, the rollers B and B′ are in contact with their respective bearing plates 17 and 17ª, and with the journal bearing blocks E and E′ free, as above described. As the truck bolster 10 moves toward the right, after it has been brought into engagement with the rollers B and B′, it is evident that both rollers B and B′ will be rolled toward the right, thus providing an anti-friction bearing. The bodily rolling action continues until the two rollers B and B′ have passed off of their respective bearing plates 17 and 17ª. In the case of the roller B′, the latter moves up into the space 18, thereby permitting the journal bearing blocks E′ to engage the tracks 19 and thereafter the roller B′ rotates about a relatively fixed axis, thus providing for unlimited travel. Simultaneously with the roller B′ passing off of its bearing plate 17ª, the roller B passes off of its bearing plate 17 and the journal D thereof begins to climb the curved portions 14ª of the supporting flanges, thus elevating the roller B and relieving it of further bearing pressure. When the load is discontinued, it is evident that the roller B, together with its journal bearing blocks E, will automatically return down the curved portions 14ª of the supporting flanges and push the spacer roller C, the latter in turn pushing the roller B′ back to its normal position.

In actual practice, the bearing plates 17 and 17ª will be made of such a width that the rollers B and B′ will remain in contact therewith for all ordinary swiveling actions of the truck. Where a car encounters an excessively sharp curve as at terminals or repair shops, the extra travel will be taken care of by the rollers rotating on their respective journals, as above described.

I have herein shown and described what I now consider the preferred manner of carrying out the invention, but the same is merely illustrative, and I contemplate all changes and modifications that come within the scope of the claims appended hereto.

I claim:

1. In an anti-friction bearing, the combination with a retaining member having longitudinally separated bearing surfaces; of a pair of anti-friction rollers each normally adapted to roll on one of said bearing surfaces; means for elevating one of said rollers when the bearing is actuated in one direction and for elevating the other roller when the bearing is actuated in the opposite direction; and journal bearings for each roller movable therewith and normally inactive but adapted to be operative when the corresponding roller passes off of its bearing surface to a point between the bearing surfaces.

2. In an anti-friction bearing, the combination with a retaining member adapted to be secured to the under side of a body bolster and provided with upper longitudinally separated bearing surfaces; of a pair of anti-friction rollers, each normally adapted to roll on one of said bearing surfaces; means for elevating one of said rollers dependent upon the direction in which the bearing is actuated; and translatable journal bearings for each of said rollers movable in unison therewith and adapted to support the rollers when the latter pass off of their respective bearing surfaces to a position between the bearing surfaces.

3. In an anti-friction bearing, the combination with a retaining member having longitudinally separated bearing surfaces on the interior thereof and provided also with side tracks at the ends of said bearing surfaces; of a pair of anti-friction rollers each normally adapted to roll on one of said bearing surfaces, each roller being provided with journals at its ends; journal bearing blocks mounted on said journal bearings, in alinement with said tracks and normally slightly spaced therefrom; means for elevating one of said rollers when the bearing is actuated in one direction, the other of said rollers moving to a position between said bearing surfaces and permitting said journal bearing blocks to engage the tracks to thereby adapt said roller for rotation about a relatively fixed axis thereafter.

4. In an anti-friction bearing, the combination with a retaining member adapted to be secured to the under side of a body bolster and having interior downwardly facing longitudinally spaced bearing surfaces; of a pair of anti-friction rollers each normally adapted to roll on one of said bearing surfaces, one of said rollers moving to a point between the bearing surfaces and the other off of its bearing surface, when the bearing is actuated in one direction and vice versa; and journal bearing blocks at the ends of the rollers movable in unison therewith, the journal bearing blocks of the roller moving to a point between said bearing surfaces being adapted to rotatably support said roller.

5. In an anti-friction bearing, the combination with a retaining member provided on the interior with bearing surfaces having a space therebetween; of a pair of anti-friction rollers each having extended journals at its ends; means for supporting said rollers from said retaining member by the ends of said journals; a spacer interposed between said rollers; and journal bearing blocks on said journals movable therewith and normally inoperative, said journal bearing blocks being arranged to support the rollers when the latter are positioned opposite said space between the bearing surfaces.

6. In an anti-friction bearing, the combination with a housing having a top wall and depending side walls adapted to be secured to a body bolster, said top wall having spaced bearing surfaces on the under side thereof, said side walls having supporting flanges along their edges and curved upwardly at their ends; of a pair of anti-friction rollers within said housing each normally adapted to roll upon a bearing surface; journals extended from the ends of said rollers supported on said flanges and adapted to elevate a roller when they engage with the corresponding curved portions of said flanges; and journal bearing blocks mounted on said journals at the opposite ends of the rollers, the journal bearing blocks of one roller when the latter is moved opposite said space, supporting said roller to adapt it to rotate about a relatively fixed axis.

7. In an anti-friction bearing, the combination with a housing having a top wall and depending side walls adapted to be secured to a body bolster, said top wall having spaced bearing surfaces on the under side thereof, said side walls having supporting flanges along their edges and curved upwardly at their ends; of a pair of anti-friction rollers within said housing each normally adapted to roll upon a bearing surface; journals extended from the ends of said rollers supported on said flanges and adapted to elevate a roller when they engage with the corresponding curved portions of said flanges; journal bearing blocks mounted on said journals at the opposite ends of the rollers, the journal bearing blocks of one roller when the latter is moved opposite said space, supporting said roller to adapt it to rotate about a relatively fixed axis; and a spacing roller interposed between said anti-friction rollers and supported at its ends by said flanges.

In witness that I claim the foregoing I have hereunto subscribed my name this 15th day of Feb. 1922.

JOHN F. O'CONNOR.

Witnesses:
CARRIE GAILING,
ANN BAKER.